No. 655,891. Patented Aug. 14, 1900.
W. R. PITT.
GATE OPERATING MECHANISM.
(Application filed May 22, 1899.)
(No Model.)
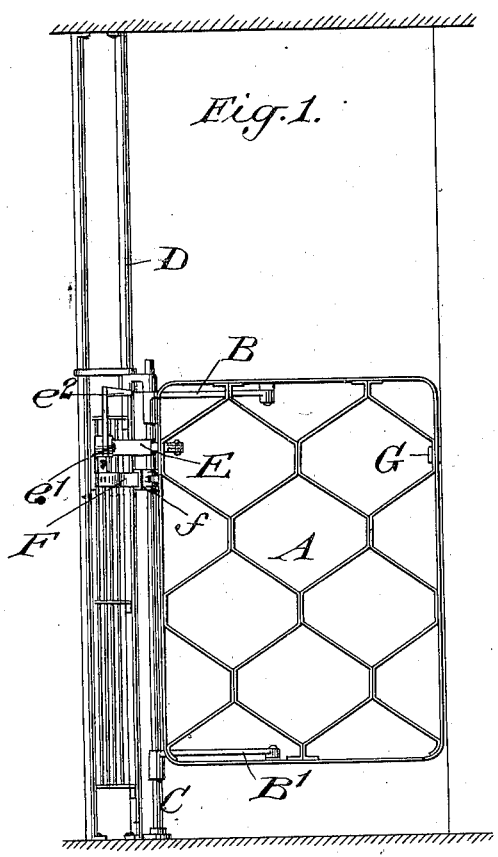
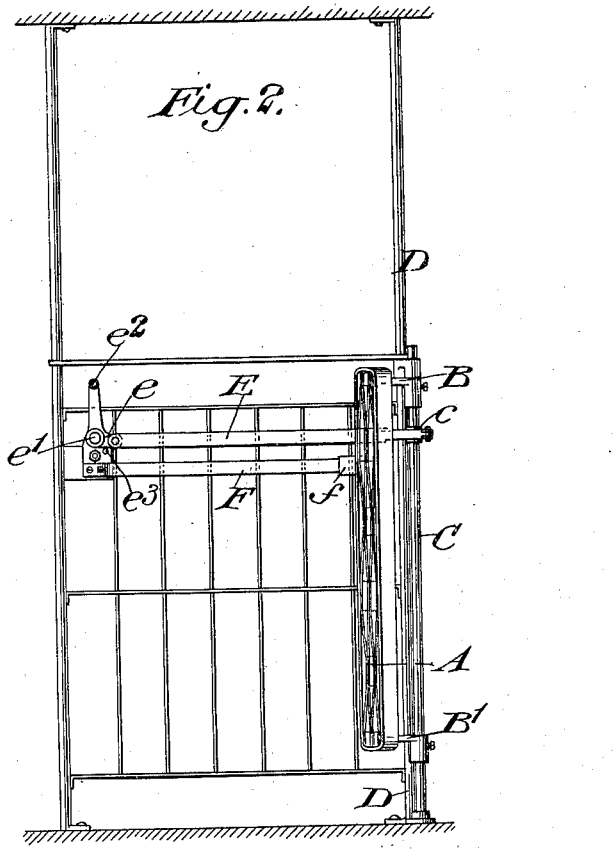
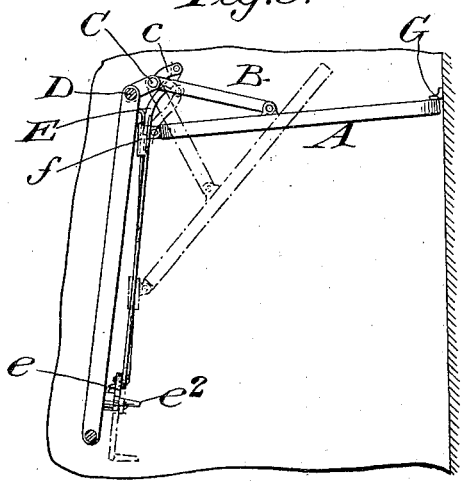
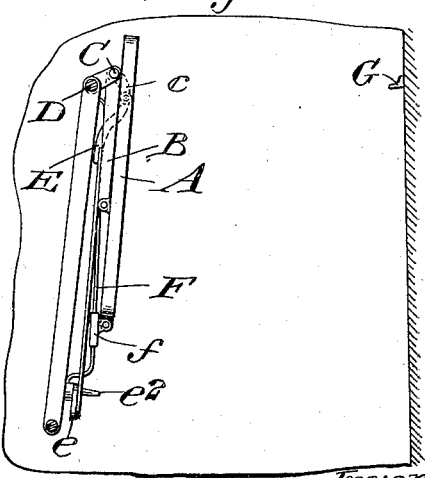
Witnesses:—
George Barry Jr.
Edward Vieser
Inventor:—
Wm. R. Pitt
By Browns Seward
his Attorneys

UNITED STATES PATENT OFFICE.

WILLIAM R. PITT, OF NEW ROCHELLE, NEW YORK.

GATE-OPERATING MECHANISM.

SPECIFICATION forming part of Letters Patent No. 655,891, dated August 14, 1900.

Application filed May 22, 1899. Serial No. 717,725. (No model.)

*To all whom it may concern:*

Be it known that I, WILLIAM R. PITT, a citizen of the United States, and a resident of New Rochelle, in the county of Westchester and State of New York, have invented a new and useful Improvement in Gate-Operating Mechanism, of which the following is a specification.

My invention relates to an improvement in mechanism for opening and closing swinging gates, and more particularly to mechanism for opening and closing gates that are pivotally supported on the free ends of swinging arms.

A practical embodiment of my invention is represented in the accompanying drawings, in which—

Figure 1 represents in side elevation the gate in its closed position. Fig. 2 is a similar view looking at the gate edgewise. Fig. 3 is a top plan view showing in full lines the gate in its closed position and in dotted lines the gate partially opened, and Fig. 4 is a similar view showing the gate in its full open position.

I have shown the gate in the present instance arranged to form a closure at the entrance and exit side of a car-platform—such, for example, as is commonly in use where a passage-way between successive cars of a train is provided for by means of an opening through the central portion of the dashboard of each car. I have furthermore shown my invention in connection with a gate of skeleton form extending throughout a portion only of the height of the space to be closed; but I wish it to be understood that the gate might be of other than skeleton form, and it might be extended upwardly and downwardly at pleasure to form a door, if so desired.

The gate is denoted by A. It is pivotally supported on the free ends of a pair of swinging arms B B', the latter extending laterally from and secured to a vertical spindle C, held in suitable bearings in proximity to a post or wall, in the present instance in proximity to the corner-post D of the car-balcony in such a manner as to permit it to rotate.

To the spindle C there is fixed a crank-arm $c$, having its free end connected by an operating-rod E with the arm $e$ of a bell-crank lever pivoted at $e'$ to a suitable fixed support on the dashboard and provided with an operating-handle $e^2$ for rocking it on its support.

The connection of the operating-rod E with the bell-crank lever is such that when the gate is in its closed position, Figs. 1, 2, and 3, the arm $e$ of the bell-crank lever and the connecting-rod E will be on or a little past center with respect to the fulcrum $e'$ of the bell-crank lever, thereby locking the gate in its closed position. A stop $e^3$ is conveniently provided to arrest the movement of the angle-lever just as it carries the operating-rod E past center with respect to the fulcrum of the lever.

The heel end of the gate is caused to traverse a predetermined path, in the present instance along in proximity to the dashboard, by means of a fixed track F, secured to the dashboard, and a slide $f$, pivoted or hinged to the heel end of the gate.

A catch or stop G may or may not be provided at the free edge of the gate to prevent the latter from springing outwardly when in its closed position. The gate will be, as above explained, locked in this position, but as a matter of further security the stop G may be employed, if desired.

To open the gate, the handle $e^2$ of the angle-lever is drawn toward the operator standing at the passage-way at the middle portion of the dashboard, the effect being as the angle-lever is rocked to draw the connecting-rod E inwardly and through its connection with the spindle C to rock the latter, thereby carrying the gate supported upon the arms B B' bodily inward.

The connection of the heel edge of the gate with the track F causes the gate to swing on the arms B B' as it is carried bodily inwardly until it is finally folded in position in proximity to the dashboard, as shown in Fig. 4. This motion of the angle-lever is intended to be a little more than a half-revolution, so that the connecting-rod E will be on or a little past center with respect to the fulcrum of the angle-lever when the latter has been rocked into the position shown in Fig. 4 to completely open the gate. This will serve to lock the gate in its opened position, so that it cannot be manipulated either when in its closed or open position except by the angle-lever.

Particular attention is called to the position of the supporting-arms B B' oblique to the gate A when the latter is in its closed position, thereby forming effective braces for the gate at the same time that they form its support, and, further, to the comparatively-small field through which the operating angle-lever is required to swing to throw the gate from its closed to its open position, and vice versa, and also to the narrow field through which the body of the gate passes during its opening and closing movements.

What I claim is—

The combination with a gate, swinging arms forming a support for and having a pivotal connection with the gate and a spindle to which the swinging arms are secured, of a crank-arm secured to said spindle, an angle-lever and a connecting-rod between the angle-lever and crank-arm, the arrangement being such that the connecting-rod is thrown on or past center as the gate reaches the limit of its swinging movement thereby locking the gate at the limit of its swinging movement, substantially as set forth.

In testimony that I claim the foregoing as my invention I have signed my name, in presence of two witnesses, this 11th day of April, 1899.

WILLIAM R. PITT.

Witnesses:
 FREDK. HAYNES,
 EDWARD VIESER.